(12) United States Patent
Ishihara et al.

(10) Patent No.: US 8,020,454 B2
(45) Date of Patent: Sep. 20, 2011

(54) TORQUE DETECTION DEVICE AND ELECTRIC POWER STEERING APPARATUS USING THE SAME

(75) Inventors: Toshiharu Ishihara, Kashiba (JP); Yoshitomo Tokumoto, Nabari (JP); Sinji Hakamata, Toyota (JP); Kaname Joushita, Toyota (JP); Tomoharu Horiuchi, Toyota (JP); Noriyuki Yahata, Okazaki (JP); Naoki Nakane, Toyota (JP)

(73) Assignees: JTEKT Corporation, Osaka (JP); Denso Corporation, Kariya (JP)

( * ) Notice: Subject to any disclaimer, the term of this patent is extended or adjusted under 35 U.S.C. 154(b) by 442 days.

(21) Appl. No.: 12/088,255

(22) PCT Filed: Sep. 27, 2006

(86) PCT No.: PCT/JP2006/319135
§ 371 (c)(1),
(2), (4) Date: May 28, 2008

(87) PCT Pub. No.: WO2007/037255
PCT Pub. Date: Apr. 5, 2007

(65) Prior Publication Data
US 2010/0147620 A1 Jun. 17, 2010

(30) Foreign Application Priority Data
Sep. 28, 2005 (JP) .................. 2005-282310

(51) Int. Cl.
*G01L 3/00* (2006.01)
(52) U.S. Cl. ......... 73/862.331; 73/862.191; 73/862.321; 73/862.325; 73/862.332
(58) Field of Classification Search .......... 180/443, 180/862.333; 73/862.333, 862.325, 862.331, 73/862.332, 862.334, 862.335
See application file for complete search history.

(56) References Cited

U.S. PATENT DOCUMENTS
4,885,944 A * 12/1989 Yagi et al. ............... 73/862.335
(Continued)

FOREIGN PATENT DOCUMENTS
| JP | A-2-162211 | 6/1990 |
| JP | A-10A324252 | 12/1998 |
| JP | A-2003-104218 | 4/2003 |

(Continued)

OTHER PUBLICATIONS

Japanese Patent Office, Office Action for Japanese Patent Application No. 2005-282310 (with partial English translation), May 17, 2011, pp. 1-7 (p. 1 for partial English translation).

*Primary Examiner* — Lisa M Caputo
*Assistant Examiner* — Punam Roy
(74) *Attorney, Agent, or Firm* — Oliff & Berridge, PLC

(57) ABSTRACT

A torque detection device has a magnetic flux collecting ring, arranged outside an outer periphery of a magnetic circuit forming member which is provided in a rotating body applied with a torque, for collecting a magnetic flux generated by the magnetic circuit forming member; a detector for detecting the torque applied to the rotating body based on a density of the magnetic flux collected by the magnetic flux collecting ring; and a holding ring for holding the magnetic flux collecting ring and the detector and including an attachment part to be attached to a stationary object on an outer periphery on one side in a radial direction. An attachment-preventing convex part for preventing attachment to the stationary object by contacting the stationary object is formed on one end face in an axis line direction of the holding ring.

4 Claims, 14 Drawing Sheets

U.S. PATENT DOCUMENTS

| | | | |
|---|---|---|---|
| 6,644,134 B2 * | 11/2003 | Laidlaw et al. | 73/862.331 |
| 6,880,411 B2 | 4/2005 | Nakane et al. | |
| 7,047,824 B2 | 5/2006 | Nakane et al. | |
| 7,089,809 B2 | 8/2006 | Nakane et al. | |
| 7,428,847 B2 * | 9/2008 | Osuka et al. | 73/862.331 |
| 7,509,883 B2 * | 3/2009 | Murakami et al. | 73/862.331 |
| 2003/0167857 A1 | 9/2003 | Sugimura et al. | |
| 2005/0223820 A1 * | 10/2005 | Murakami et al. | 73/862.331 |

FOREIGN PATENT DOCUMENTS

| | | |
|---|---|---|
| JP | 2003-149062 A | 5/2003 |
| JP | 2003-329523 A | 11/2003 |
| JP | A-2004-101277 | 4/2004 |
| JP | A-2005-265587 | 9/2005 |
| JP | 2005-300267 A | 10/2005 |
| JP | A-2005-300267 | 10/2005 |
| JP | 2006-71326 A | 3/2006 |

\* cited by examiner

TORQUE DETECTION DEVICE AND ELECTRIC POWER STEERING APPARATUS USING THE SAME

CROSS-REFERENCE TO PRIOR APPLICATIONS

This is a U.S. national phase application under 35 U.S.C. §371 of International Patent Application No. PCT/JP2006/319135, filed Sep. 27, 2006, and claims the benefit of Japanese Application No. 2005-282310, filed Sep. 28, 2005, both of which are incorporated by reference herein. The International Application was published in Japanese on Apr. 5, 2007 as International Publication No. WO 2007/037255 A1 under PCT Article 21(2).

TECHNICAL FIELD

The present invention relates to a torque detection device for detecting a torque applied to a rotating body, and an electric power steering apparatus including the torque detection device and a steering assist electric motor.

BACKGROUND ART

A torque detection device is disclosed in Patent Document 1 and the like. The torque detection device of Patent Document 1 includes two magnetic flux collecting rings, arranged in a spaced side by side relation in an axis line direction outside an outer periphery of a magnetic circuit forming member provided in a rotating body which includes an input shaft and an output shaft coupled by a torsion bar, for collecting the magnetic flux generated by the magnetic circuit forming member; and a detector for detecting the torque applied to the rotating body based on the density of the magnetic flux collected by each magnetic flux collecting ring.

The torque detection device configured as above is incorporated in an electric power steering apparatus for a vehicle and the like. The electric power steering apparatus includes the rotating body of which input shaft is connected to a steering wheel; a tubular housing for accommodating and supporting the rotating body; a steering assist electric motor connected to the output shaft by way of a reduction gear mechanism; and a control unit connected to a drive circuit of the electric motor and the detector and configured using a microprocessor, where the detector detects the torque applied to the input shaft when the steering wheel is steered through a torsion generated in the torsion bar, and the drive of the electric motor is controlled based on the detected torque.

When incorporating the torque detection device to the housing, the entire torque detection device is inserted to the inside from one end of the housing, and fixed inside.
[Patent Document 1] Japanese Patent Application Laid-Open No. 2003-149062

DISCLOSURE OF THE INVENTION

Problems To Be Solved By the Invention

However, in the torque detection device configured as in Patent Document 1, the entire torque detection device is inserted to the inside of the housing and fixed inside the housing, and thus the task of fixing the torque detection device at an appropriate position in the housing is difficult to carry out, and improvement is desired.

FIG. 14 is a cross sectional view showing, in an enlarged manner, one part of an electric power steering apparatus equipped with an improved torque detection device. The applicant of the present invention developed a torque detection device equipped with a holding ring 104 including a ring part 102 holding a magnetic flux collecting ring 100 and a detector 101, an attachment part 103 arranged in a projecting manner at the outside of one side in a radial direction of the ring part 102, and a flange arranged around the distal end of the attachment part 103. A housing 105 of the electric power steering apparatus includes a pass-through hole 106 that passes through in the radial direction, an attachment seat 107 continuing to the hole edge of the pass-through hole 106, and a screw hole perforated in the attachment seat 107, so that the holding ring 104 of the torque detection device is inserted into the pass-through hole 106 from the radially outward side of the housing 105, the flange is contacted to the attachment seat 107, and a machine screw is tightened to the screw hole from an insertion hole perforated in the flange to fix the torque detection device to the housing 105.

The fixing workability of the torque detection device can be improved according to the above configuration. However, since both ends in the axis line direction of the holding ring 104 have a similar shape, when the holding ring 104 is inserted to the pass-through hole 106 of the housing 105, the holding ring 104 might be inserted into the pass-through hole 106 in a direction opposite to the appropriate direction, and attached to the housing 105 in such state. If the holding ring 104 is attached in the direction opposite to the appropriate direction, the phase on a coordinate axis of the electrical characteristics of the output signal outputted from the detector 101 becomes the opposite of the phase of the electrical characteristics of the output signal outputted from the detector 101 when the holding ring 104 is attached in the appropriate direction.

The present invention is provided in view of the above situation, and the main object thereof is to provide a torque detection device capable of being reliably prevented from being attached to a stationary object in a direction opposite to the appropriate direction. Another object is to provide a torque detection device capable of being attached to a stationary object without taking directivity into consideration. Another further object is to provide an electric power steering apparatus capable of reliably preventing the torque detection device from being incorporated in the housing in the direction opposite to the appropriate direction. Another further object is to provide an electric power steering apparatus capable of incorporating the torque detection device in the housing without taking directivity into consideration.

Means For Solving the Problems

A torque detection device according to a first aspect includes: a magnetic flux collecting ring arranged outside an outer periphery of a magnetic circuit forming member which is provided in a rotating body applied with a torque, the magnetic flux collecting ring for collecting a magnetic flux generated by the magnetic circuit forming member; a detector for detecting the torque applied to the rotating body based on a density of the magnetic flux collected by the magnetic flux collecting ring; and a holding ring for holding the magnetic flux collecting ring and the detector and having an attachment part to be attached to a stationary object on an outer periphery; wherein the holding ring has an attachment-preventing convex part for preventing attachment to the stationary object by contacting the stationary object on one end face in an axis line direction.

A torque detection device according to a second aspect includes: a magnetic flux collecting ring arranged outside an outer periphery of a magnetic circuit forming member which is provided in a rotating body applied with a torque, the magnetic flux collecting ring for collecting a magnetic flux generated by the magnetic circuit forming member; a detector for detecting the torque applied to the rotating body based on a density of the magnetic flux collected by the magnetic flux collecting ring; and a holding ring for holding the magnetic flux collecting ring and the detector and having an attachment part to be attached to a stationary object on an outer periphery; wherein the holding ring is symmetric in an axis line direction with a middle in the axis line direction as a center.

An electric power steering apparatus according to a third aspect includes: the torque detection device according to the first or second aspect; a housing having a pass-through hole passing in a radial direction through a cylindrical part for accommodating and supporting the rotating body and being attached with the attachment part with the holding ring fitted into the pass-through hole; a steering shaft connected to the rotating body; a control unit for driving a steering assist electric motor based on the torque detected by the torque detection device; and transmitting means for transmitting a rotation force of the electric motor to a steering mechanism.

Effects of the Invention

According to the first aspect, since the attachment-preventing convex part is arranged on one end face in the axis line direction of the holding ring, the attachment-preventing convex part contacts the stationary object thereby preventing attachment to the stationary object when attached to the stationary object in a direction opposite to an appropriate direction. Therefore, attachment to the stationary object in a direction opposite to the appropriate direction is reliably prevented.

According to the second aspect, attachment to the stationary object becomes possible without taking directivity into consideration since the holding ring is formed symmetric to the axis line direction with the middle in the axis line direction as the center. In this case, the holding ring is directed in one of the two directions, and thus the electrical characteristics of the output signal outputted from the detector become appropriate electrical characteristics or electrical characteristics whose phase on the coordinate axis is the opposite from the appropriate electrical characteristics. Which one is the electrical characteristic is found from the quality inspection after assembling. If the phase of the electrical characteristics of the output signal outputted from the detector is the opposite of the phase of the electrical characteristics of the output signal outputted from the detector when the holding ring is attached in the appropriate direction from the quality inspection, the phase of the electrical characteristics of the output signal outputted from the detector can be corrected by rewriting the set data stored in the memory of the detector.

According to the third aspect, the attachment-preventing convex part is arranged on one end face in the axis line direction of the holding ring, and thus when the torque detection device is inserted to the pass-through hole of the housing in a direction opposite to the appropriate direction, the attachment-preventing convex part contacts the housing and thus cannot be inserted into the pass-through hole. Therefore, the torque detection device is reliably prevented from being incorporated into the housing in the direction opposite to the appropriate direction.

Since the holding ring of the torque detection device is formed symmetric to the axis line direction with the middle in the axis line direction as the center, the holding ring of the torque detection device can be inserted to the pass-through hole of the housing without taking directivity into consideration. In this case, the torque detection device is directed in one of the two directions, and thus the electrical characteristics of the output signal outputted from the detector become appropriate electrical characteristics or electrical characteristics whose phase on the coordinate axis is the opposite from the appropriate electrical characteristics. Which one is the electrical characteristic is found from the quality inspection after assembling. If the phase of the electrical characteristics of the output signal outputted from the detector is the opposite of the phase of the electrical characteristics of the output signal outputted from the detector when the holding ring is attached in the appropriate direction from the quality inspection, the phase of the electrical characteristics of the output signal outputted from the detector can be corrected by electrically rewriting the set data stored in the memory of the detector.

EXPLANATION OF REFERENCE NUMERALS

Figure 1:
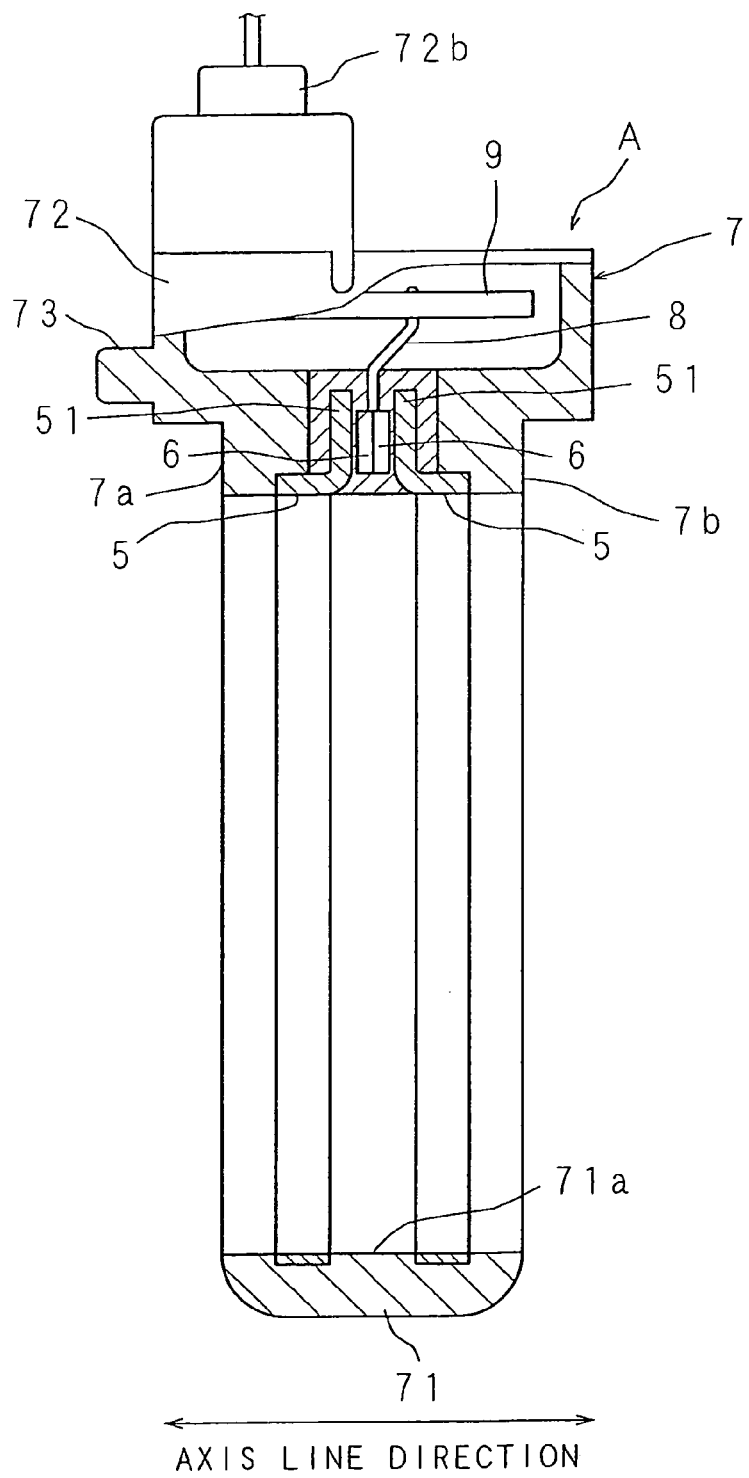
FIG. 1 is a cross sectional view showing a configuration of a torque detection device according to the present invention.

A torque detection device
B stationary object
2 first rotating body (rotating body)
3 second rotating body (rotating body)
4 magnetic circuit forming member
5 magnetic flux collecting ring 6 detector
7 holding ring
72 attachment part
73 attachment-preventing convex part
20 steering shaft
21 transmission shaft (transmitting means)
25 housing (stationary object)
25a cylindrical part
25c pass-through hole
26 electric motor
28 control unit

BEST EMBODIMENT FOR IMPLEMENTING THE INVENTION

The present invention will be described in detail below with reference to the drawings showing embodiments thereof.

First Embodiment

Figure 2:
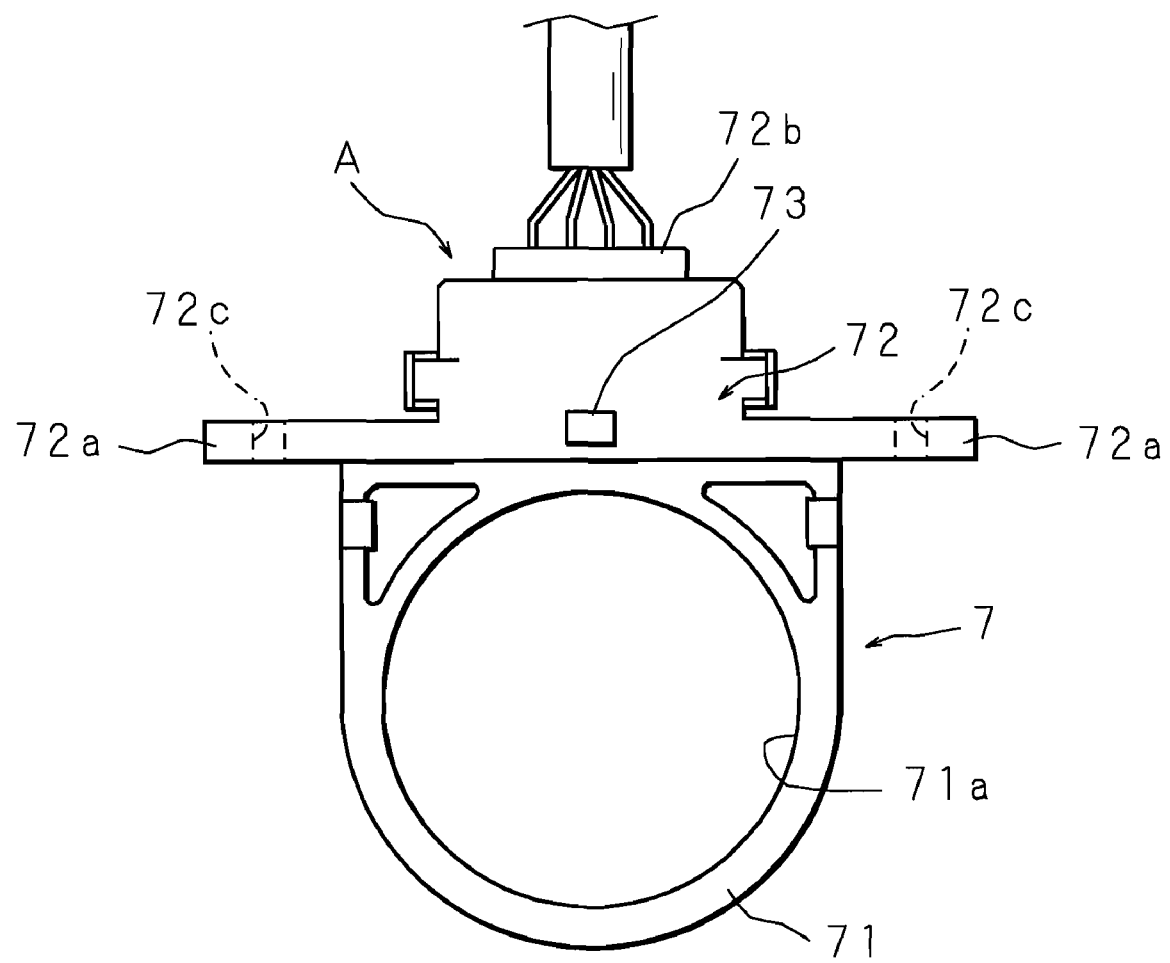
FIG. 2 is a side view showing the configuration of the torque detection device according to the present invention.
Figure 3:
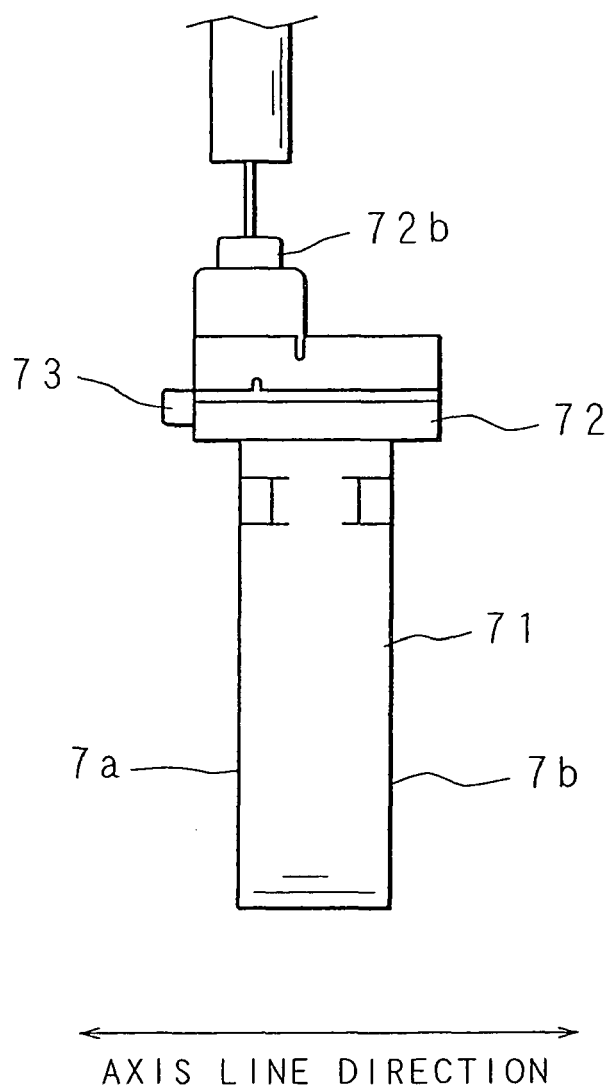
FIG. 3 is a front view showing the configuration of the torque detection device according to the present invention.
Figure 4:
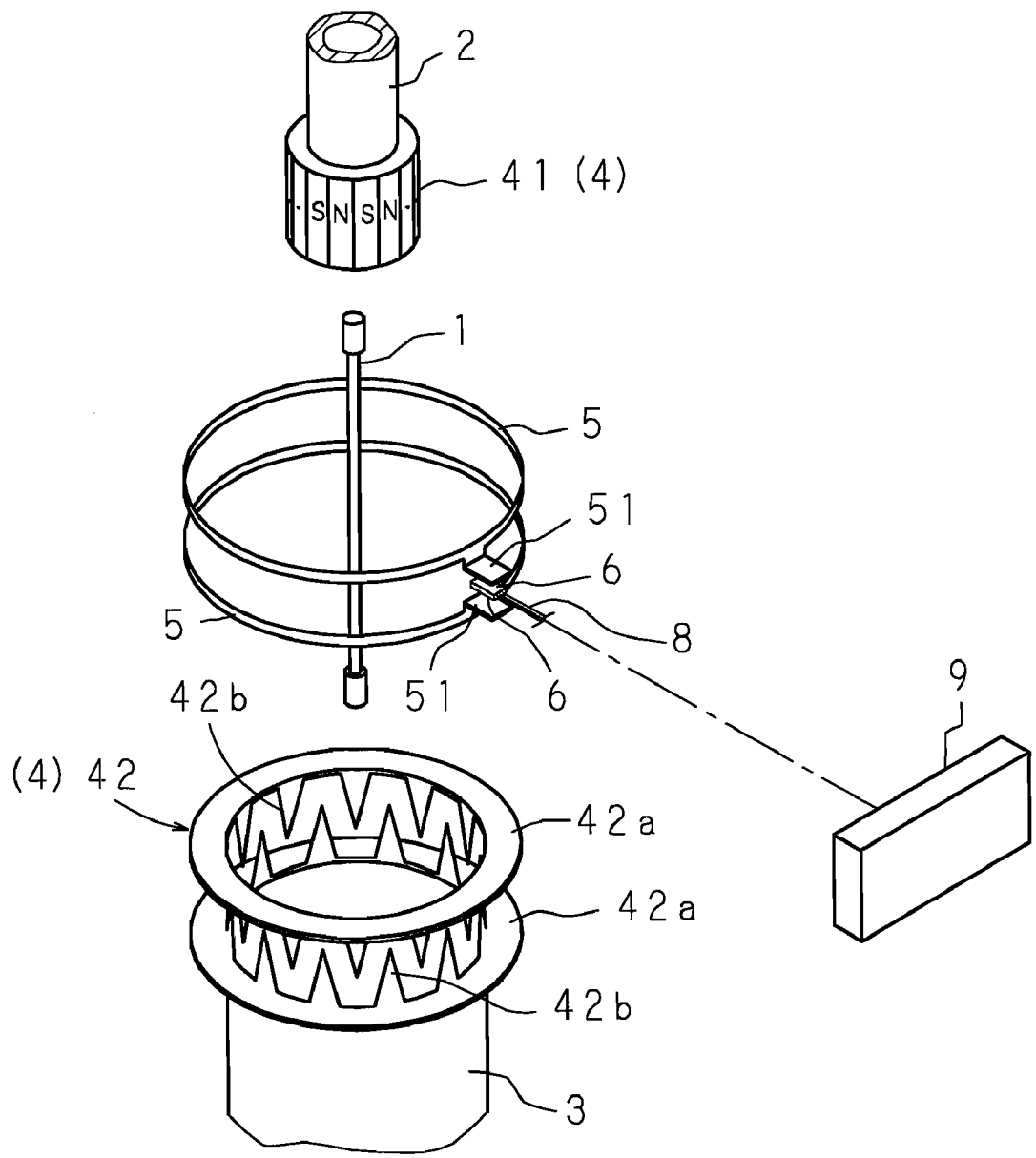
FIG. 4 is a frame format exploded perspective view showing the configuration of the torque detection device according to the present invention.
Figure 5:
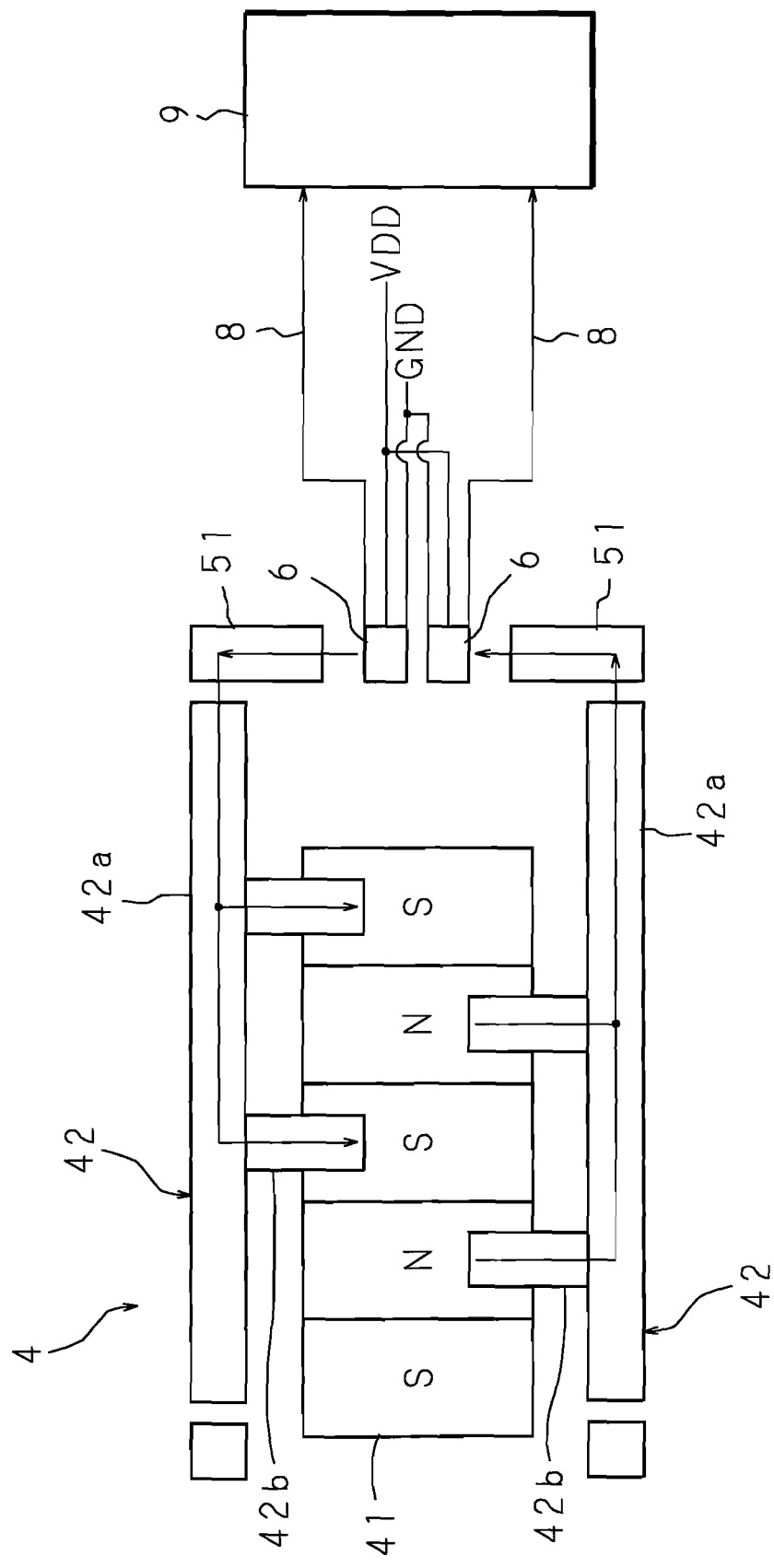
FIG. 5 is an explanatory view of a magnetic circuit formed when a rotating body is rotated in one direction.

FIG. 1 is a cross sectional view showing a configuration of a torque detection device according to the present invention, FIG. 2 is a side view showing the configuration of the torque detection device, FIG. 3 is a front view showing the configuration of the torque detection device, FIG. 4 is a frame format exploded perspective view showing the configuration of the torque detection device, and FIG. 5 is an explanatory view of a magnetic circuit formed when a rotating body is rotated in one direction.

A torque detection device A includes two magnetic flux collecting rings 5, 5, arranged spaced apart in an axis line direction outside the outer periphery of a magnetic circuit forming member 4 of a first rotating body 2 and a second rotating body 3 coaxially coupled by a torsion bar 1, for collecting the magnetic flux generated by the magnetic circuit forming member 4; a detector 6 for detecting the torque applied to the first rotating body 2 based on the density of the magnetic flux collected by each magnetic flux collecting ring 5, 5; a holding ring 7 for holding the magnetic flux collecting rings 5, 5 and the detector 6 and including an attachment part 72 on the outer periphery; and a detection circuit substrate 9 connected to the detector 6 by a conductive wire 8. The magnetic circuit forming member 4 includes a plurality of permanent magnets 41 attached to the outer periphery of the first rotating body 2, and two magnetic rings 42, 42 arranged on the outer periphery of the permanent magnet 41 and externally fitted to and fixed to the second rotating body 3.

The permanent magnet 41 is a multi-pole polarized ring in which the N pole and the S pole are alternately polarized at a plurality of circumferential positions, and is externally fitted to and fixed to the outer periphery of the first rotating body 2.

The magnetic rings 42, 42 include two annular plate parts 42a, 42a facing each other while being spaced apart in the axis line direction of the second rotating body 3 and a plurality of comb teeth 42b, 42b extending from the annular plate parts 42a, 42a in a direction of approaching each other, and relatively rotate with the permanent magnet 41 to change the magnetic flux density between the magnetic rings 42, 42. The comb teeth 42b, 42b are arranged at equidistance so as to alternately engage with each other in the circumferential direction, where the magnetic rings 42, 42 are molded by a synthetic resin material with the comb teeth 42b, 42b alternately engaging with each other to form a molded body.

The magnetic flux collecting rings 5, 5 are extended radially outward from one location in the circumferential direction thereby forming a cylindrical shape having convex strips 51, 51 arranged on both sides of the detector 6, so that the magnetic flux is collected at the convex strips 51, 51. The magnetic flux collecting rings 5, 5 are formed by shaping a magnetic plate such as an iron plate.

The holding ring 7 includes an ring part 71 which has a pass-through hole 71a corresponding to the inner circumferential surface of the magnetic flux collecting rings 5, 5 and is internally fitted and fixed with the magnetic flux collecting rings 5, 5, and an attachment part 72 which is arranged in a projecting manner at one location on the outer circumference of the ring part 71, where the ring part 71 and the attachment part 72 are integrally shaped by synthetic resin material. Both ends in the axis line direction of the holding ring 7 have a similar shape. The end faces 7a, 7b in the axis line direction of the ring part 71 are substantially parallel, the circumferential surface between the end faces 7a, 7b has a substantially U-shape, and the attachment part 72 is arranged between the ends in the circumferential direction of the circumferential surface.

The attachment part 72 includes flanges 72a, 72a arranged in a projecting manner in a tangential direction of the ring part 71, and forms a substantially solid rectangular body with a cavity on the inside. Both end faces in the axis line direction of the attachment part 72 are substantially parallel, and an attachment-preventing convex part 73 that contacts a stationary object B such as a housing, to be hereinafter described, to prevent attachment to the stationary object B is integrally arranged in a projecting manner at one end in the axis line direction. The convex strips 51, 51, the detector 6, and the detection circuit substrate 9 are arranged inside the attachment part 72, and a conductive wire retrieving part 72b is arranged on the side opposite to the ring part 71. Insertion holes 72c, 72c for machine screws are formed in the flanges 72a, 72a.

The detector 6 is a Hall IC including a Hall element of which electrical characteristics (resistance) changes according to change in magnetic flux density generated between the convex strips 51, 51 of the magnetic flux collecting rings 5, 5; and an EEPROM (Electrical Erasable Programmable ROM) memory that can store in advance the set data of the electrical characteristics (resistance) outputted by the Hall element and electrically rewrite the stored set data in fields, where the detected signal detected by the detector 6 is provided to the detection circuit substrate 9. The set data stored in the memory can be electrically rewritten so as to become the data in which the phase on the coordinate axis is inverted with the X axis as the center. In addition to including the Hall element, the detector 6 may include a magnetic sensitive element of which electrical characteristics (resistance) changes by the effect of the magnetic field such as a magneto-resistance effect element (MR element) and the like, and it is not limited to the Hall element.

As described above, both ends in the axis line direction of the holding ring 7 have a similar shape, but since the attachment-preventing convex part 73 is arranged at one end in the axis line direction of the attachment part 72, and the attachment-preventing convex part 73 is configured to contact the stationary object B such as the housing, to be hereinafter described, the holding ring 7 can be inserted to the pass-through hole without being hindered by the attachment-preventing convex part 73 when the holding ring 7 is inserted to the pass-through hole etc. of the stationary object B in an appropriate direction, and the holding ring 7 can be positioned at an appropriate position. When the holding ring 7 is inserted to the pass-through hole of the stationary object B in a direction opposite to the appropriate direction, the attachment-preventing convex part 73 contacts the stationary object B and the holding ring 7 cannot be inserted to the pass-through hole, and thus the holding ring 7 cannot be attached in the direction opposite to the appropriate direction.

Figure 6:
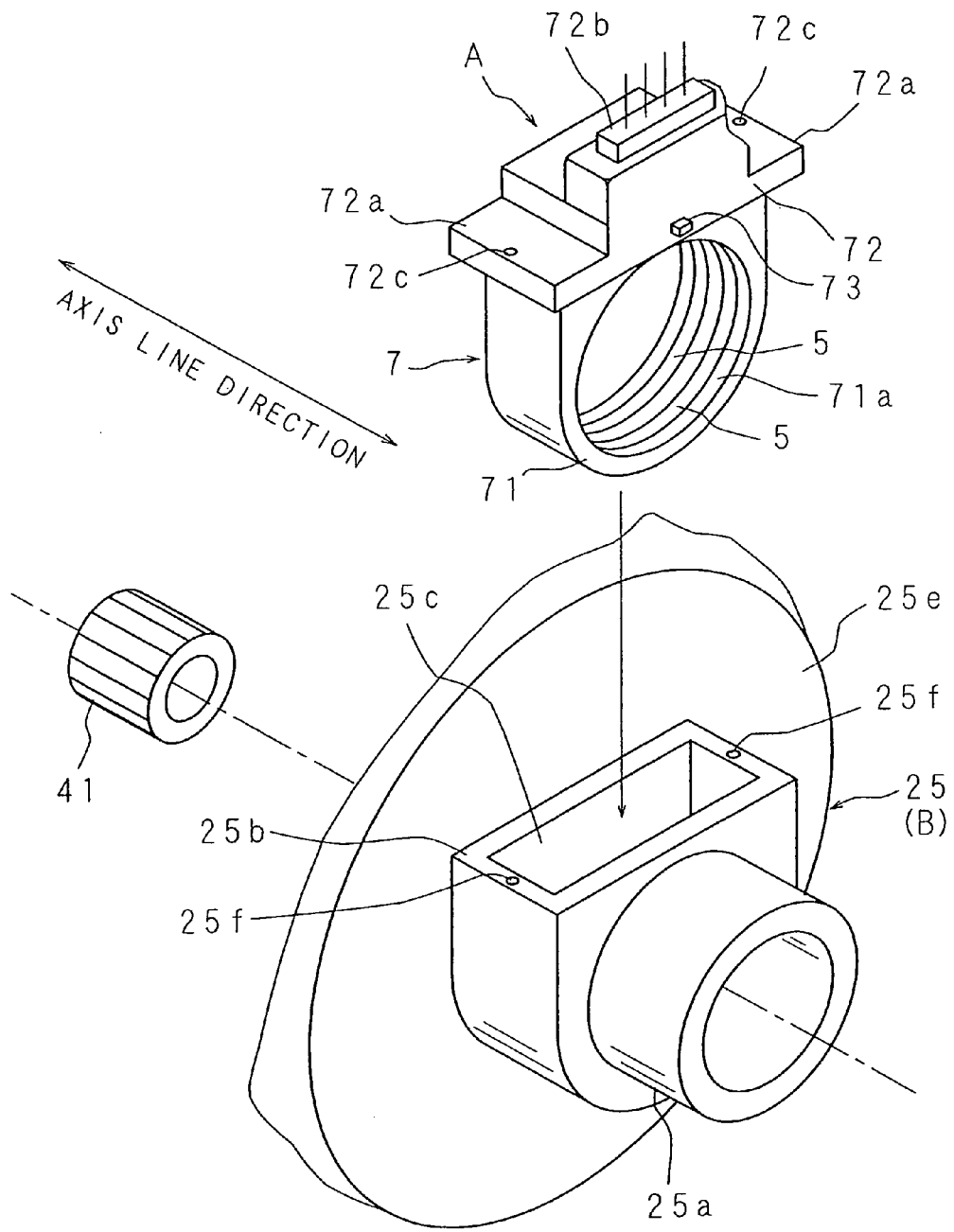
FIG. 6 is an exploded perspective view of the main parts showing an example where the torque detection device is used in the electric power steering apparatus.
Figure 7:
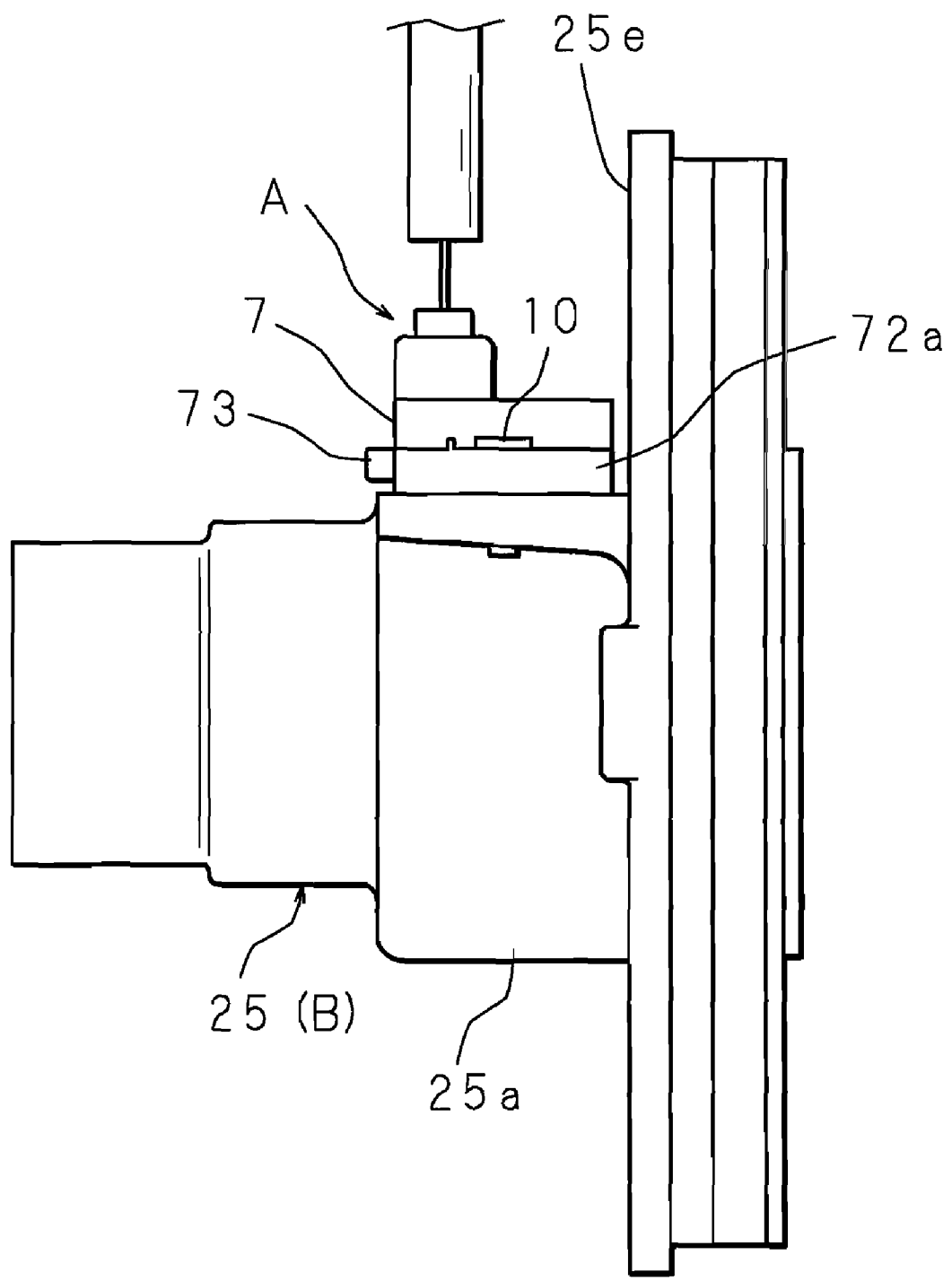
FIG. 7 is a front view showing a configuration of the main parts of the electric power steering apparatus according to the present invention.
Figure 8:
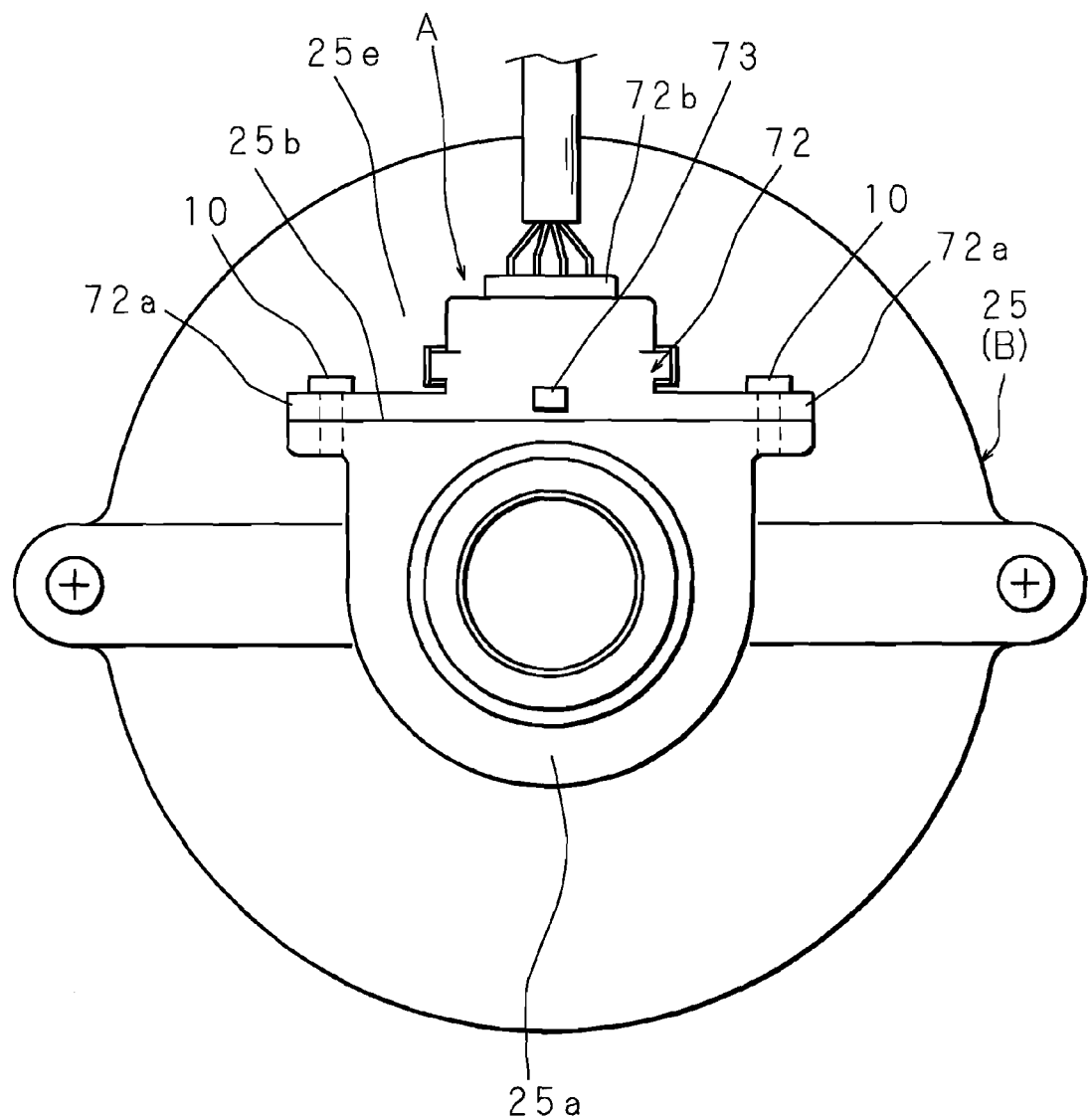
FIG. 8 is a side view showing a configuration of the main parts of the electric power steering apparatus according to the present invention.
Figure 9:
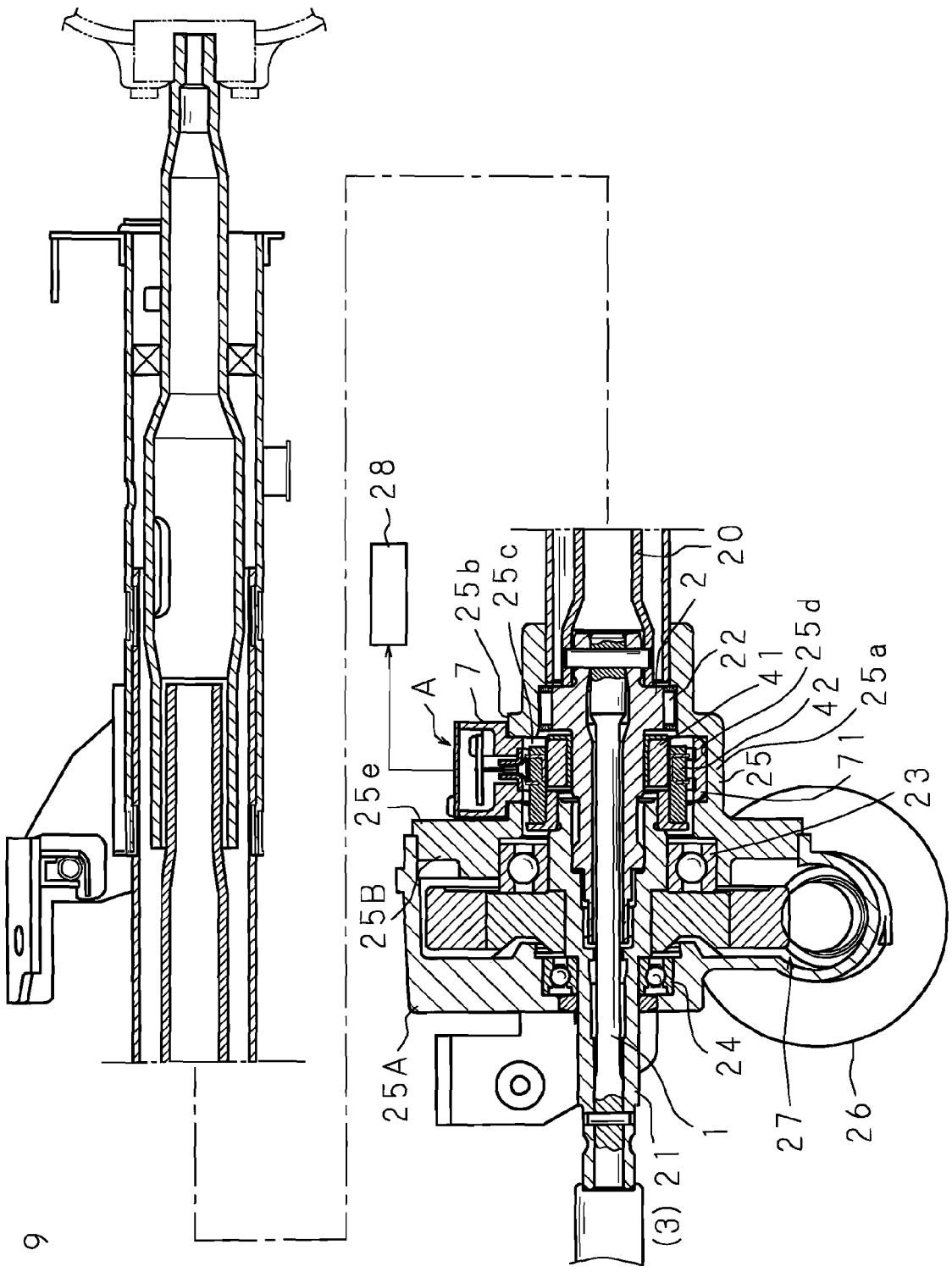
FIG. 9 is a cross sectional view showing a configuration of the entire electric power steering apparatus according to the present invention.

FIG. 6 is an exploded perspective view of the main parts showing an example where the torque detection device is used in the electric power steering apparatus, FIG. 7 is a front view showing a configuration of the main parts, FIG. 8 is a side view showing a configuration of the main parts, and FIG. 9 is a cross sectional view showing a configuration of the entire electric power steering apparatus.

The torque detection device A configured as above is used, for example, in the electric power steering apparatus for a vehicle. The electric power steering apparatus includes a steering shaft 20 having the upper end connecting to the steering member and the lower end connecting to the first rotating body 2; a transmission shaft 21 (second rotating body 3) coaxially connected to the steering shaft 20 by way of the torsion bar 1; a housing 25 for surrounding the first rotating body 2 and the transmission shaft 21 and rotatably accommodating and supporting the first rotating body 2 and the transmission shaft 21 with three bearings 22, 23, 24; a steering assist electric motor 26 attached to the housing 25; a reduction gear mechanism 27 for transmitting the rotation force of a drive shaft of the electric motor 26 to the output shaft 21; the torque detection device A; and a control unit 28 configured using a microprocessor connected to the detection circuit substrate 9 of the torque detection device A and a drive circuit of the electric motor 26.

The housing 25 serving as the stationary object B includes a cylindrical part 25a surrounding the first rotating body 2 and the transmission shaft 21, an attachment seat 25b, arranged in a projecting manner at one location on the outer periphery of the cylindrical part 25a, for attaching the attachment part 72 of the holding ring 7, a pass-through hole 25c passing through the attachment seat 25b in the radial direction and forming a rectangular cross section for arranging the ring part 71 in the cylindrical part 25a, and a fit-in groove 25d continuing from the pass-through hole 25c and being curved in correspondence to the ring part 71 of the holding ring 7. The housing 25 includes a first tubular body 25A having a substantially bowl shape and accommodating the reduction gear mechanism 27 and a second tubular body 25B including a collar part 25e for closing an opening of the first tubular body 25A and accommodating the ring part 71, where the attachment seat 25b and the pass-through hole 25c are formed in the vicinity of the collar part 25e of the second tubular body 25B.

The attachment seat 25b is arranged at a position facing the flanges 72a, 72a, two screw holes 25f, 25f corresponding to the insertion holes 72c, 72c are formed in the attachment seat 25b, and the holding ring 7 is attached to the housing 25 by screw-fitting the machine screw 10 inserted to the insertion holes 72c, 72c of the flanges 72a, 72a to the screw holes 25f, 25f. The pass-through hole 25c has a rectangular cross section of a size corresponding to the cross sectional shape of the ring part 71, where when the holding ring 7 is inserted to the pass-through hole 25c in the direction opposite to the appropriate direction, the attachment-preventing convex part 73 contacts the collar part 25e so that the holding ring 7 cannot be inserted to the pass-through hole 25c.

The holding ring 7 is positioned in the cylindrical part 25a of the magnetic flux collecting rings 5, 5, and the flanges 72a, 72a are attached to the attachment seat 25b by inserting the ring part 71 to the cylindrical part 25a from the pass-through hole 25c passing through the cylindrical part 25a of the housing 25 in a radial direction and engaging the ring part 71 to the fit-in groove 25d. After attaching the holding ring 7, the first rotating body 2 and the transmission shaft 21 are inserted into the cylindrical part 25a from the axis line direction of the housing 25, and the permanent magnet 41 and the magnetic ring 42 are arranged on the inner side of the magnetic flux collecting rings 5, 5.

The electric power steering apparatus configured as above has the attachment-preventing convex part 73 arranged in the torque detection device A, and thus when the torque detection device A is incorporated in the housing 25 in a direction opposite to the appropriate direction, the attachment-preventing convex part 73 contacts the collar part 25e of the housing 25 and thus the torque detection device A cannot be incorporated in the housing 25. Therefore, the torque detection device A is reliably prevented from being incorporated in the housing 25 in a direction opposite to the appropriate direction. When the torque detection device A is incorporated in the appropriate direction, the attachment-preventing convex part 73 does not contact the collar part 25e since the attachment-preventing convex part 73 is arranged on the side opposite to the collar part 25e.

In the electric power steering apparatus, the rotation torque applied to the steering shaft 20 when the steering member is steered is detected by the detector 6 from the torsion generated in the torsion bar 1, the detected torque is converted to voltage signal and provided to the control unit 28, the drive of the electric motor 26 is controlled by an instruction signal outputted from the control unit 28, and the transmission shaft 21 is rotated through the reduction gear mechanism 27.

Second Embodiment

Figure 10:
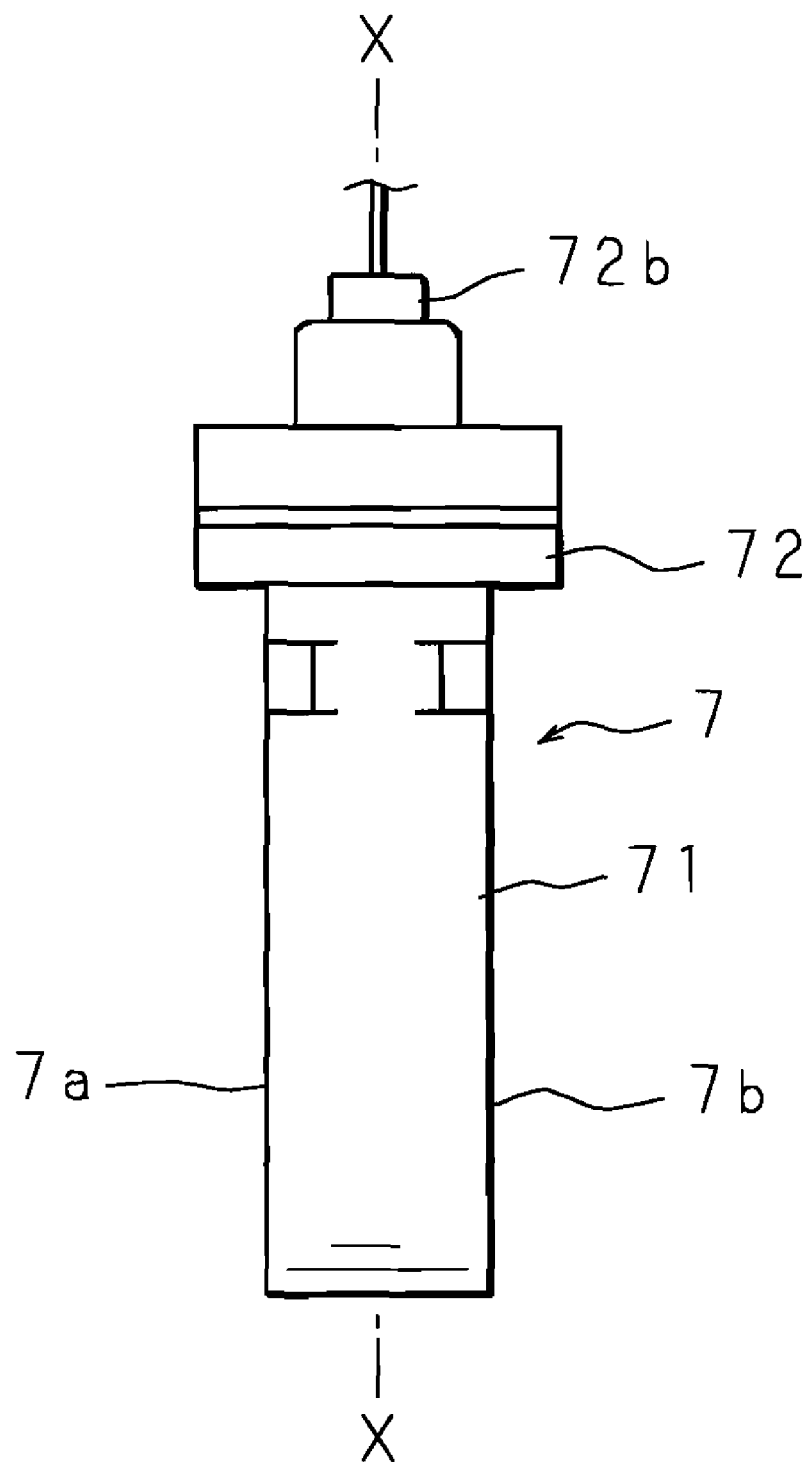
FIG. 10 is a front view showing a configuration of a second embodiment of the torque detection device according to the present invention.
Figure 11:
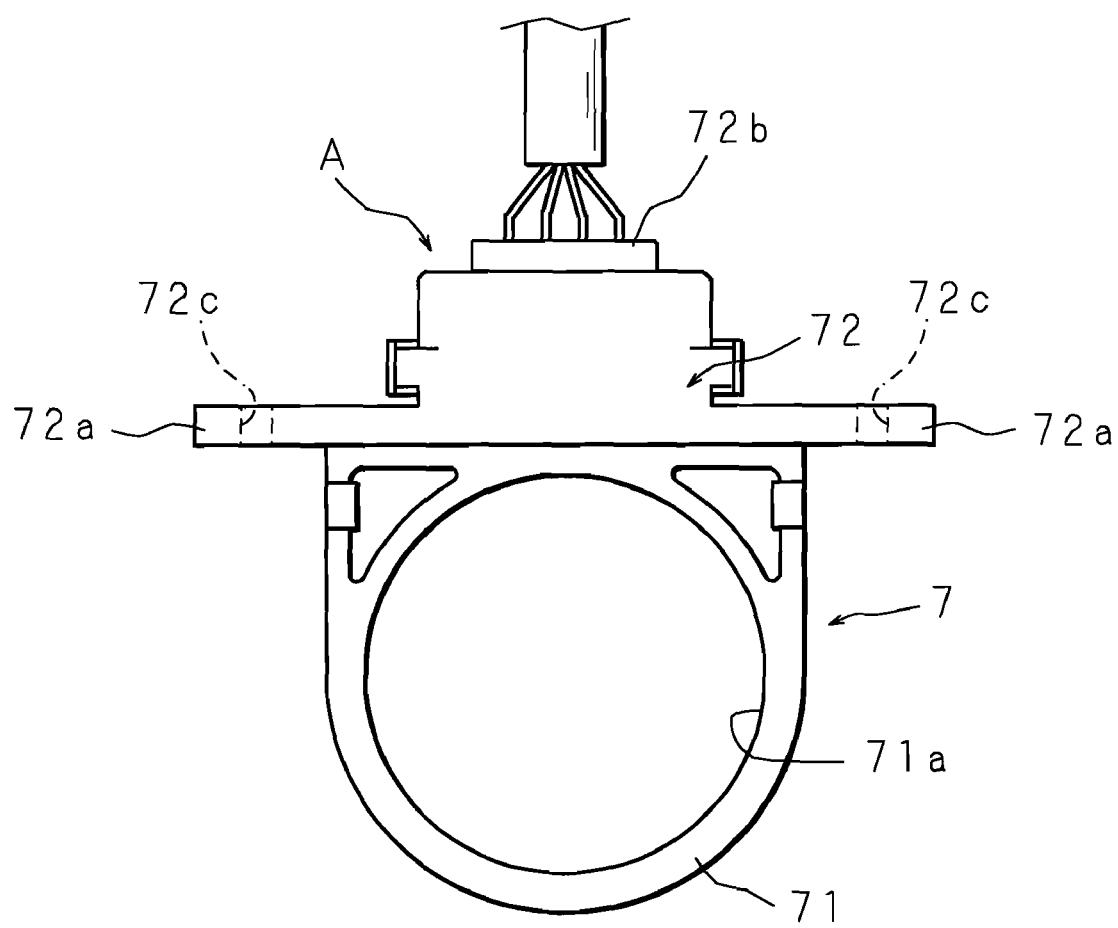
FIG. 11 is a side view showing a configuration of the second embodiment of the torque detection device according to the present invention.
Figure 12:
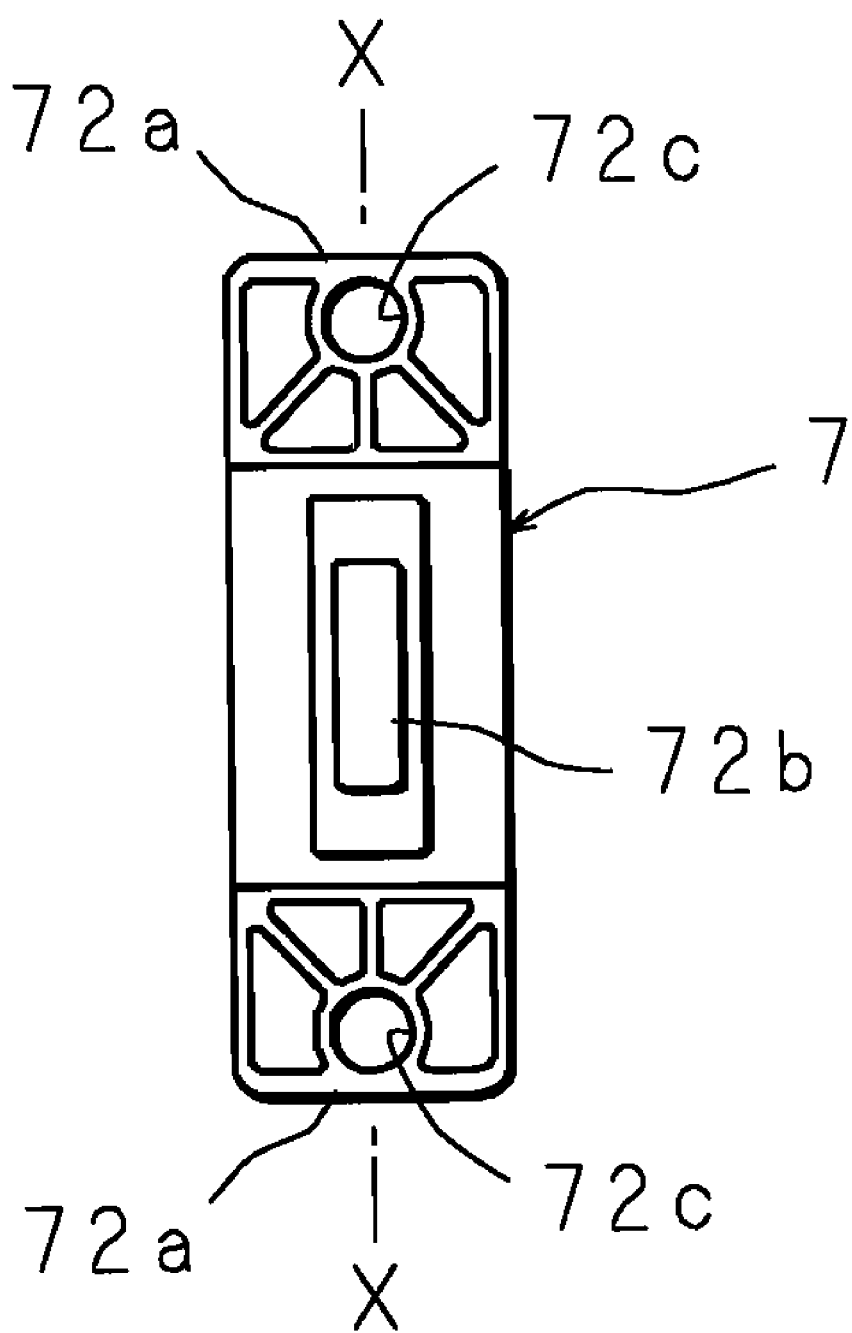
FIG. 12 is a plan view showing a configuration of the second embodiment of the torque detection device according to the present invention.

FIG. 10 is a front view showing a configuration of a second embodiment of the torque detection device, FIG. 11 is a side view, and FIG. 12 is a plan view. In this torque detection device, the attachment-preventing convex part 73 of the first embodiment is omitted, and the conductive wire retrieving part 72b and the insertion holes 72c, 72c are arranged at the middle in the axis line direction of the attachment part 72, so that the holding ring 7 can be incorporated in the housing 25 while being formed symmetric in the axis line direction with the middle X in the axis line direction as the center and without taking directivity into consideration.

In the second embodiment, the detector 6 is configured by the Hall IC, and includes a magnetic sensitive element and an EEPROM memory.

Figure 13:
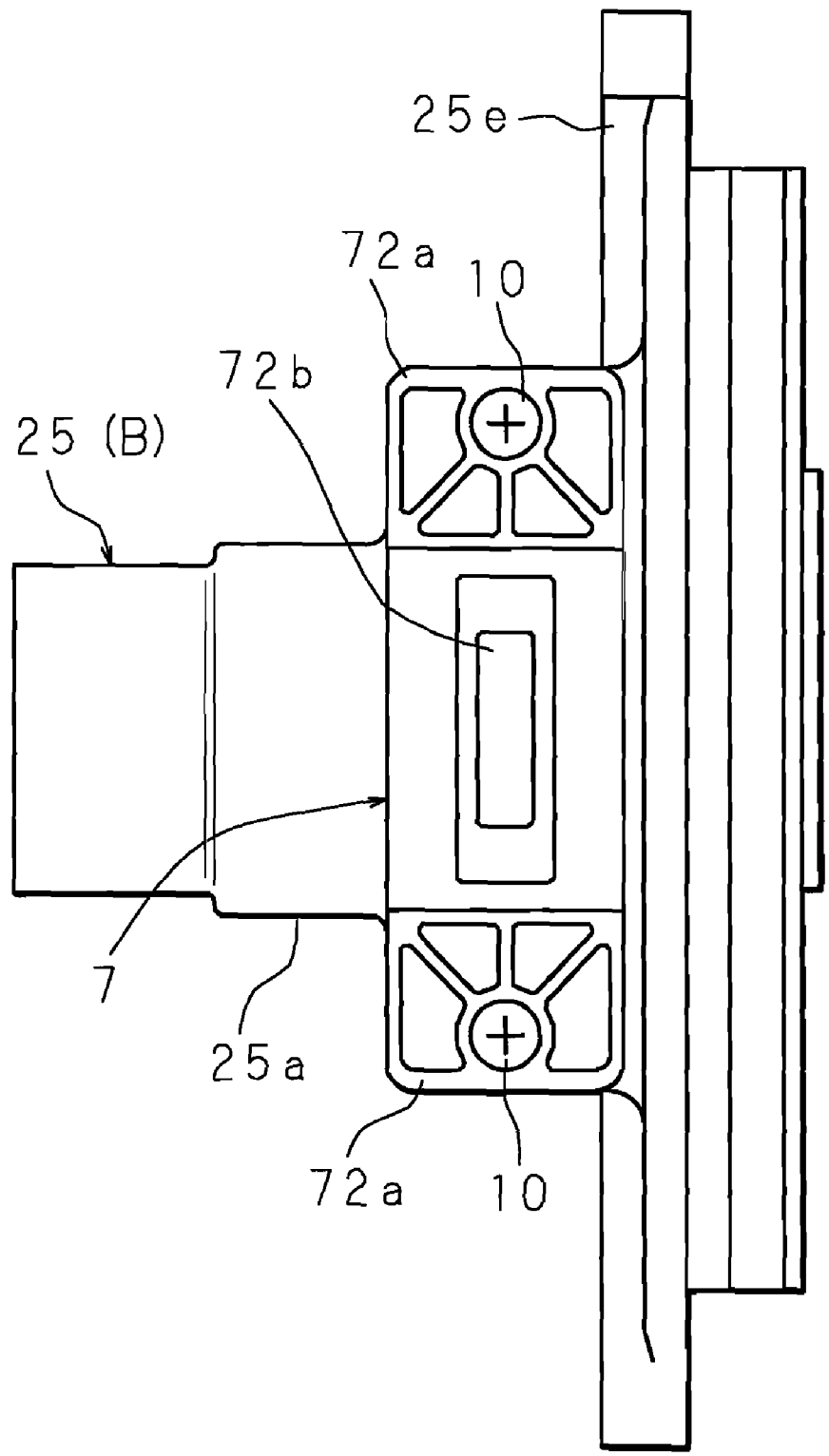
FIG. 13 is a plan view of the main parts showing an example where the torque detection device of the second embodiment is used in the electric power steering apparatus.
Figure 14:
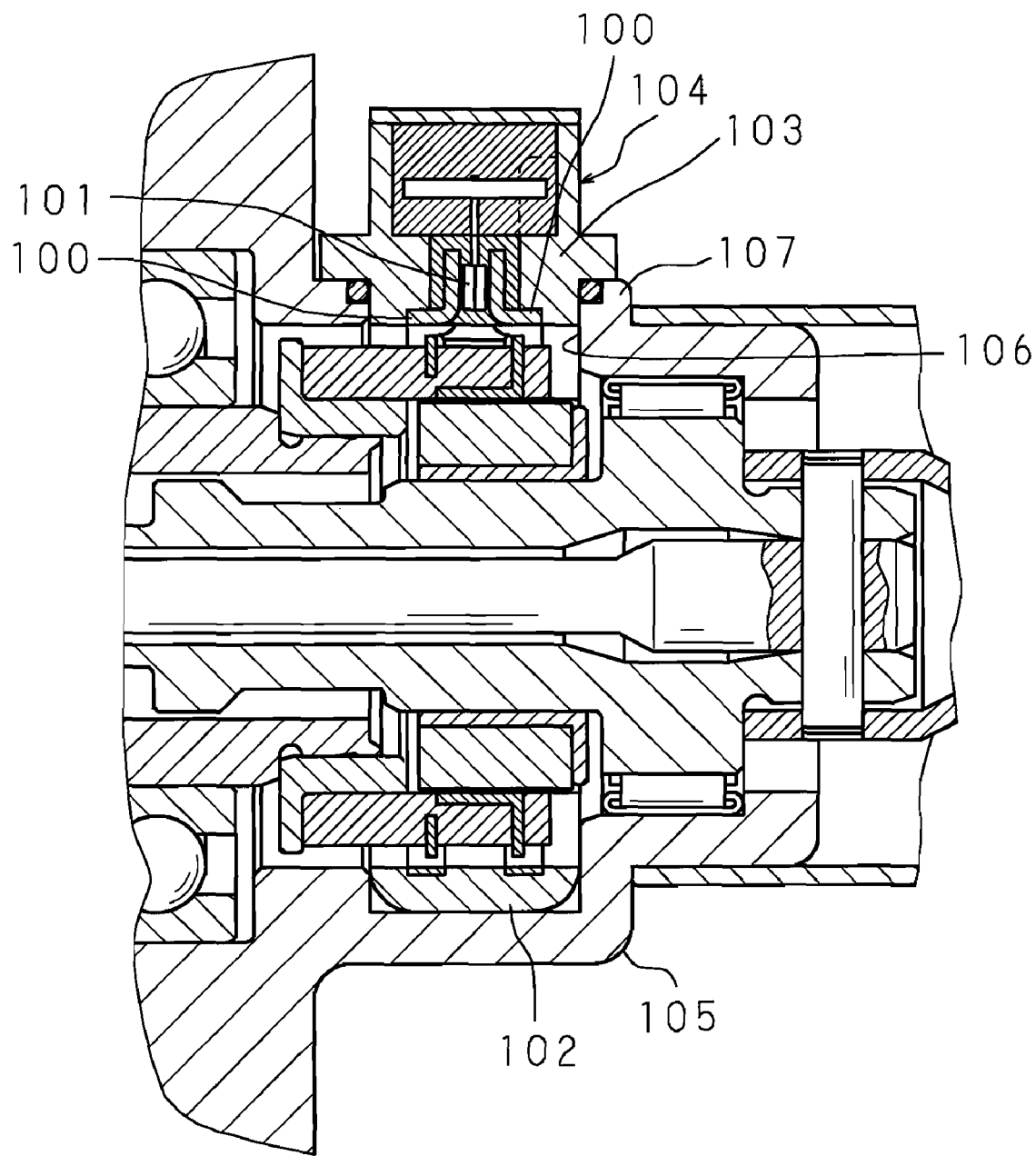
FIG. 14 is a cross sectional view showing, in an enlarged manner, one part of an electric power steering apparatus equipped with an improved torque detection device.

FIG. 13 is a plan view of the main parts showing an example of use in the electric power steering apparatus. When incorporating the torque detection device of the second embodiment to the housing 25 of the electric power steering apparatus, the holding ring 7 can be inserted to the pass-through hole 25c without taking the directivity of the holding ring 7 into consideration, and the attachment part 72 can be attached to the attachment seat 25b with the machine screw 10. When the phase of the electrical characteristics of the detected signal outputted from the detector 6 is the opposite of the phase of the electrical characteristics of the output signal outputted from the detector 6 when the holding ring 7 is attached in the appropriate direction from the quality inspection after assembly, the phase of the electrical characteristics of the output signal outputted from the detector 6 can be corrected by electrically rewriting the set data stored in the memory of the detector 6. When the phase of the electrical characteristics of the detected signal outputted from the detector 6 is appropriate from the quality inspection, the phase of the electrical characteristics of the output signal does not need to be corrected.

INDUSTRIAL APPLICABILITY

In addition to being used in the electric power steering apparatus, the torque detection device A according to the present invention is also applicable to apparatuses other than the electric power steering apparatus.

The invention claimed is:

1. A torque detection device comprising:
a set of magnetic flux collecting rings, arranged outside an outer periphery of a magnetic circuit forming member provided in a rotating body applied with a torque, for collecting a magnetic flux generated by the magnetic circuit forming member;
a detector for detecting the torque applied to the rotating body based on a density of the magnetic flux collected by the set of magnetic flux collecting rings; and
a holding ring for holding the set of magnetic flux collecting rings and the detector and including, on an outer periphery, an attachment part to be attached to a stationary object having a collar part,
wherein the holding ring includes, on one end face in an axis line direction thereof, an attachment-preventing convex part for preventing attachment to the stationary object by contacting the stationary object, and
wherein the attachment-preventing convex part contacts the collar part of the stationary object when the holding ring is attached to the stationary object in a direction opposite to an appropriate direction, and the attachment-preventing convex part does not contact the collar part of the stationary object when the holding ring is attached to the stationary object in the appropriate direction.

2. The torque detection device according to claim 1, wherein the attachment part has a solid rectangular shape with a cavity on the inside, and the attachment-preventing convex part is integrally arranged in a projecting manner at one end in the axis line direction of the attachment part.

3. The torque detection device according to claim 1, wherein the holding ring includes a ring part to be internally fitted and fixed with the magnetic flux collecting ring, and the ring part and the attachment part are integrally formed.

4. An electric power steering apparatus comprising:
the torque detection device according to claim 1;
the stationary object including a pass-through hole passing in a radial direction through a cylindrical part for accommodating and supporting the rotating body and being attached with the attachment part with the holding ring fitted into the pass-through hole;
a steering shaft connected to the rotating body;
a control unit for driving a steering assist electric motor based on the torque detected by the torque detection device; and
a transmission unit for transmitting a rotation force of the electric motor to a steering mechanism.

* * * * *